United States Patent
Drupsteen

[11] Patent Number: 6,073,238
[45] Date of Patent: Jun. 6, 2000

[54] METHOD OF SECURELY LOADING COMMANDS IN A SMART CARD

[75] Inventor: Michel Marco Paul Drupsteen, Na Alkmaar, Netherlands

[73] Assignee: Koninklijke PTT Nederland N.V., Groningen, Netherlands

[21] Appl. No.: 08/828,350

[22] Filed: Mar. 28, 1997

[30] Foreign Application Priority Data

Mar. 29, 1996 [EP] European Pat. Off. .............. 96200867

[51] Int. Cl.[7] ........................................... G06F 13/00
[52] U.S. Cl. ........................ 713/200; 713/201; 714/38
[58] Field of Search .................................... 711/163, 164; 395/186, 187.01, 188.01; 380/3, 4, 21, 22, 24, 43, 45; 235/350, 387.5; 714/38; 713/200, 201, 202

[56] References Cited

U.S. PATENT DOCUMENTS

| | | | |
|---|---|---|---|
| 4,879,747 | 11/1989 | Leighton et al. | 380/23 |
| 5,007,089 | 4/1991 | Matyas et al. | 380/49 |
| 5,120,939 | 6/1992 | Claus et al. | 235/382 |
| 5,313,639 | 5/1994 | Chao | 395/725 |
| 5,343,529 | 8/1994 | Goldfine et al. | 380/23 |
| 5,446,266 | 8/1995 | Beuk et al. | 235/382.5 |
| 5,461,217 | 10/1995 | Claus | 235/380 |
| 5,508,691 | 4/1996 | Castleman et al. | 340/825.34 |
| 5,537,474 | 7/1996 | Brown et al. | 380/23 |
| 5,544,246 | 8/1996 | Mandelbaum et al. | 380/23 |
| 5,623,637 | 4/1997 | Jones et al. | 395/491 |
| 5,635,695 | 6/1997 | Feiken | 235/380 |
| 5,644,354 | 7/1997 | Thompson et al. | 348/13 |
| 5,668,875 | 9/1997 | Brown et al. | 380/23 |
| 5,671,283 | 9/1997 | Michener et al. | 380/25 |
| 5,719,560 | 2/1998 | Watkins | 340/825.34 |
| 5,900,606 | 5/1999 | Rigal et al. | 235/375 |

FOREIGN PATENT DOCUMENTS 0 218 176  4/1987  European Pat. Off. .
41 19 924  12/1992  Germany .

OTHER PUBLICATIONS

Nishijima, T. et al., "On Application of IC Card to a Secure Distribution Sys of Software," IEEE, vol. 3, pp. 2486–2491, 1994.

*Primary Examiner*—Norman M. Wright
*Attorney, Agent, or Firm*—Oblon, Spivak, McClelland, Maier & Neustadt, P.C.

[57] ABSTRACT

A method of securely loading and validating commands (COM) in a smart card (SC) is disclosed. Especially in the case where application-specific commands are loaded by an application provider (AP), that is off-line with respect to the card issuer (CI), it must be ensured that the commands are valid. The invention provides a method involving the protection of the commands (COM) by means of authentication codes, these codes (MAC1, MAC2) being produced using two different keys: one key (K1) is stored by the card issuer (CI), the other (K2) by a trusted third party (TTP). A further authentication code (MAC3), produced using a key from a set of keys (K3*), may be utilized to selectively validate commands for individual applications (e.g. AP1, AP2).

12 Claims, 4 Drawing Sheets

METHOD OF SECURELY LOADING COMMANDS IN A SMART CARD

BACKGROUND OF THE INVENTION

The present invention relates to a method of loading commands in a smart card. More specifically, the present invention relates to a method of off-line loading application specific commands in a smart card.

In modern payment systems, the use of electronic payment means becomes increasingly important. Electronic payment means, such as memory cards and smart cards, are gaining acceptance as their applications are expanded. In many contries electronic cards are being used for public telephones and the like. Advanced cards are capable of containing electronic "purses", in addition to other functionalities. Such advanced payment means contain, in addition to a memory, a processor capable of running suitable programs.

It should be noted that in this text, the terms smart card or card will be used to denote electronic payment means having at least one integrated electronic circuit comprising a processor and a memory. The actual shape of a so-called smart card is not of importance.

The programs running on the processor of a smart card determine the services offered by the card, that is, the functions and associated data structures (e.g. purse, user identification, loyalty program) of the smart card depend on the software present in the card. As time passes, the need often arises to update the programs of the card, for example in order to add a new function or to improve an existing function. To this end, the card should be able to accept new programs which may replace other programs. However, it must be ascertained that the newly loaded programs are valid.

Authentication of programs can relatively easily be accomplished by using a secure data exchange protocol between the card issuer and the card. However, other parties, such as applications providers, want to be able to load new applications (and hence new commands) into a card without having to do this via the card issuer.

SUMMARY OF THE INVENTION

It is an object of the invention to overcome the above-mentioned and other disadvantages and to provide a method which allows commands to be loaded and activated in a smart card in a secure manner. It is a further object of the present invention to provide a method which allows application-specific commands to be loaded in a smart card by an application provider while being able to guarantee the integrity of the commands.

These and other objects are achieved by a method of securely loading commands in a smart card by a first party, the card being issued by a second party, the method according to the invention comprising the steps of:

the second party producing a first authentication code of a command using a first key, a third party producing a second authentication code of the command using a second key, transferring the command with the codes to the card, the card validating the command by reproducing the first and second authentication codes using the first and the second key respectively and comparing the reproduced codes with the transferred codes.

In the method of the present invention, the authenticity of the commands is thus safeguarded by having two different and preferably independent parties produce an authentication code: the second party, which normally is the card issuer, and a third party, which normally is a trusted independent party, such as a central bank. Once both authentication codes have been produced, it is virtually impossible to alter the commands without this being noticeable by means of the authentication codes. The first party, the application provider, has proof that both the first and second parties have "certified" the command. Preferably the third party stores copies of the command.

It will be understood that the method of the invention applies to both the loading of a single command and the loading of a set of commands.

The transferring to the card and the subsequent validation are preferably repeated when the validation fails, the use of the loaded commands being blocked until the validation succeeds. This prevents invalid commands, i.e. commands affected by transmission errors or manipulations, to be executed by the card.

Advantageously, the loaded commands are permanently disabled when the validation fails a predetermined number of times, the number preferably being less than ten. The disabling of the loaded commands may be performed by changing the key of the second party. In this way, the indefinite reloading of corrupted commands can be terminated.

The commands loaded may be application-specific commands, i.e. commands directly influencing the applications of the card. Such commands are often machine language instructions which in principle allow manipulation of the card applications. By using the method of the present invention, the use of such commands is controlled whereby the integrity of the applications is ensured.

The first and/or second authentication codes are preferably message authentication codes produced according to the ANSI (American National Standardization Institute) X9.19 standard.

Advantageously, an additional authentication code is produced by the second party, said additional code not involving the first or second key. This allows the first party a validity check without influencing the method as such.

EXEMPLARY EMBODIMENTS

Figure 1:
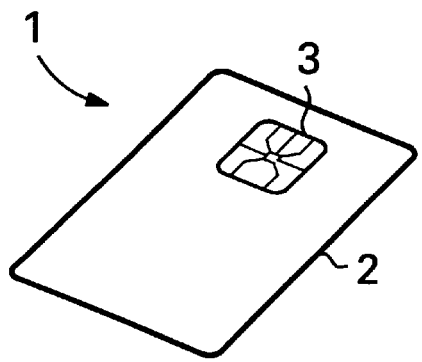
FIG. 1 shows a smart card as may be used in the method of the present invention.

The smart card or IC card 1 shown by way of example in FIG. 1 comprises a substrate 2, in which an integrated circuit is embedded. The integrated circuit is provided with contacts 3 for contacting a card reader or the like. It should be noted that the present invention can also be applied in the case of so-called contactless smart cards.

Figure 2:
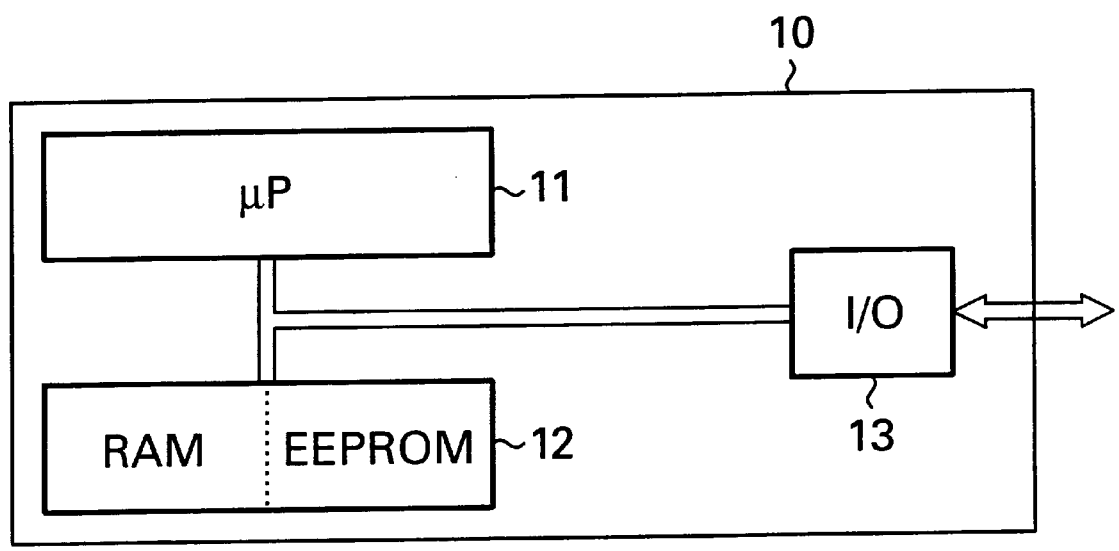
FIG. 2 schematically shows the integrated circuit of the smart card of FIG. 1.

The integrated circuit 10 shown schematically and by way of example in FIG. 2 comprises a processor 11, a memory 12 and an input/output circuit 13. The memory may comprise a volatile (RAM) memory part for temporarily storing data and a non-volatile (ROM) memory part for permanently or semi-permanently storing data. The latter part is preferably an EEPROM type memory (Electrically Erasable Programmable Read Only Memory). The data stored in the non-volatile part may contain both programming data (instructions, programs) and payment data, i.e. data relating to monetary transactions. It will be understood that a separate memory (not shown) may be provided to store the instruction set of the processor 11. The input-output circuit 13 may communicate with external devices via contacts (not shown in FIG. 2), such as the contacts 3 shown in FIG. 1. The integrated circuit 10 may be contained in the card 1 of FIG. 1.

Figure 3:
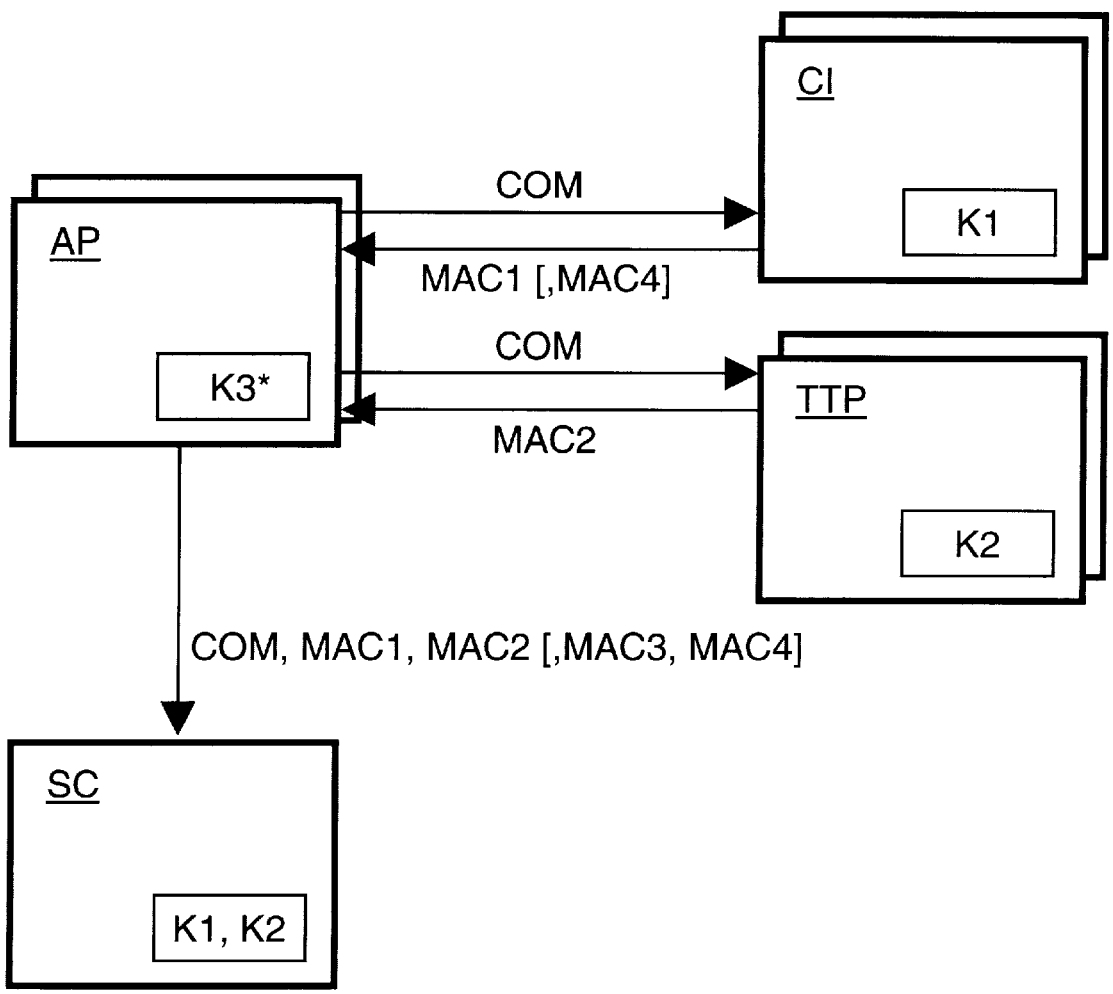
FIG. 3 schematically shows the exchange of data in the method of the present invention.

An embodiment of the method according to the invention is shown schematically and by way of example in FIG. 3. A first party, e.g. an application provider AP, offers card functions to its customers. A smart card SC is issued by a second party, a card issuer CI. According to the invention, a trusted third party TTP is involved in the validation of commands, as will be explained later.

A set of commands COM may have been produced by the card issuer CI or by an external source by order of the applications provider AP. It should be noted that the set of commands COM may comprise one or more commands. That is, the method as described here may be applied to individual commands or to a set of commands. In the following description, a single command rather than a set will be used as an example to explain the method of the invention. The commands may be application-specific commands (ASC) or general purpose commands (GPC).

As shown in FIG. 3, the application provider AP offers a command (COM) to the card issuer CI for authentication. A first authentication code MAC1, based on the command COM, is produced by the card issuer CI using a first key K1. In addition to the code MAC1 the set of commands may optionally receive an additional (fourth) authentication code MAC4 which does not involve the use of a key, at least not the key K1. The additional authentication code MAC4 serves to provide an additional verification of the command, independent of the keys used in the other authentication codes. The computation of the additional authentication code MAC4 may involve the first authentication code MAC1. In that case, the additional authentication code can be written as:

$$MAC4 = F_{K1}(COM, MAC1),$$

where F denotes a function by which the code is determined. The authentication code MAC1, and optionally the additional authentication code MAC4, is transferred to the application provider AP, where it is temporarily stored.

According to the present invention, the command COM is also offered to a trusted third party TTP. The third party produces a second authentication code MAC2 of the command COM, using a second key K2. The second authentication code MAC2 is transferred to the application provider AP. The third party is e.g. a central bank or an institution appointed by the card issuer and the service provider.

The application provider AP may produce a third authentication code MAC3 using a third key K3*. It should be noted that the key K3* may comprise a set of keys (as denoted by the asterisk), each individual key corresponding with an individual card application and/or individual card file. The key K3*, which may thus consist of a set of keys K3-1, K3-2, etc., may be used to selectively load commands into specific applications and/or files of the card. This will further be explained with reference to FIGS. 4 and 5. It should be noted that as the third key (K3) may vary between applications, the third authentication code (MAC3) also varies. That is, the third authentication code (MAC3) may constitute an application-specific authentication code. It should be noted that the third authentication code may be based on both the command COM and the first and second authentication codes, thus providing a double authentication. In that case, the third authentication code can be written as:

$$MAC3 = F_{K3}(COM, MAC1, MAC2),$$

where F denotes a function by which the code is determined.

The authentication codes MAC1 and MAC2, as well as the authentication codes MAC3 and MAC4, are preferably produced using a message authentication scheme involving encryption. Such a scheme is e.g. disclosed in the ANSI X9.19 standard. It will be understood that the actual scheme (or schemes) used in producing the message authentication codes is not essential to the present invention. The additional authentication code may also be produced using encryption (e.g. using a public key), or may be produced using a so-called hash function.

Both authentication codes MAC1 and MAC2, as well as the optional authentication codes MAC3 and MAC4, may be appended to the command, or be associated with the command in another manner. In FIG. 3, the command and its associated authentication codes is denoted by:

$$COM, MAC1, MAC2[, MAC3, MAC4],$$

the square brackets indicating the optional codes. The actual order in which the command and its associated codes is transferred may of course vary.

Upon receipt of the command by the card SC, the card reproduces the authentication codes MAC1 and MAC2 using the keys K1 and K2 which have been stored in the card previously. The reproduced codes MAC1' and MAC2' are compared with the received codes MAC1 and MAC2. If the reproduced and received codes are identical, the validation of the commands has succeeded and the commands may be activated. This activation may be done by setting (or resetting) a certain flag. If the validation fails, i.e. if the corresponding received and reproduced codes are not identical, a request for retransmission of the commands may be issued. A retransmission counter keeps track of the number of retransmissions and inhibits retransmission if a predetermined number (e.g. 5) is exceeded.

The card is thus preferably arranged in such a way that the commands loaded into the card cannot be used until they are activated. That is, the loaded commands are blocked until they are released as a result of a positive validation. This prevents invalid commands to be executed by the card.

Figure 4:
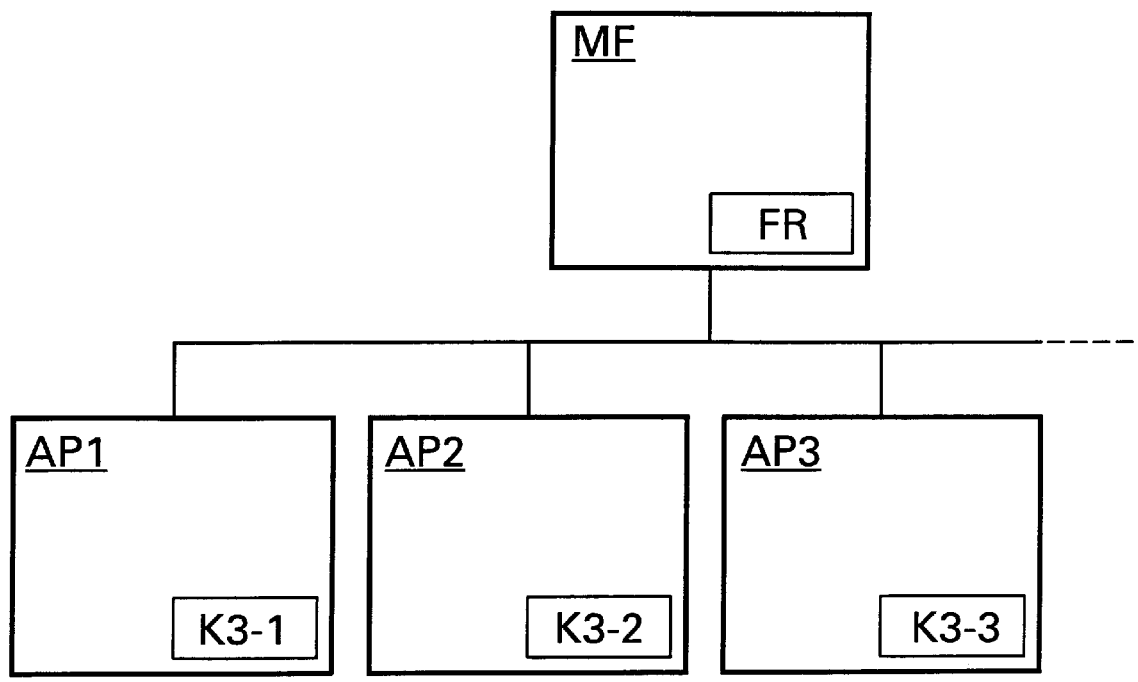
FIG. 4 schematically shows data structures on a smart card.

FIG. 4 schematically shows data structures on a smart card, such as the card 1 of FIG. 1, according to a preferred embodiment of the present invention. The data structures are in practice stored in a memory, such as the memory 12 of FIG. 2.

A so-called master file MF contains, i.a., references to other files. Other files are associated with individual applications. In FIG. 4, several so-called application files (AP1, AP2, AP3) are shown. Each application (or application file) AP1, AP2, . . . , may comprise one or more subfiles, e.g. program files and data files.

As shown in FIG. 4, each application contains a corresponding key: application 1 contains key K3-1, application 2 contains key K3-2, etc. These keys K3-*i* correspond with the keys K3-*i* of the set of keys K3* of FIG. 3 (i denoting the i$^{th}$ application). As set out above, the card is able to regenerate authentication codes (e.g. MAC1, MAC2) of a command, using one or more keys (e.g. K1, K2), and to compare the regenerated codes (e.g. MAC1, MAC2) with the received codes in order to verify the received command. That is, if the received and the regenerated authentication codes (e.g. MAC2 and MAC2') do not match, the corresponding command is not loaded into the card, or at least is barred from execution. Similarly, the keys of the set K3* may be used to selectively load commands into individual applications, the target application (e.g. AP2) being indicated by the corresponding key (e.g. K3-2). In case a certain command must be loaded into more than one application, the key K3 may contain a wildcard.

Figure 5:
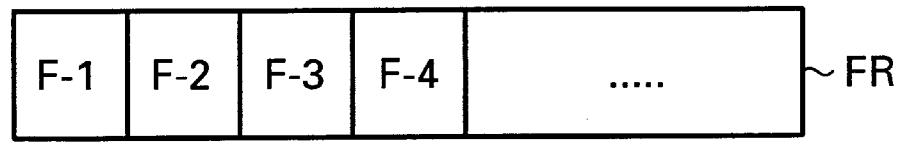
FIG. 5 schematically shows a flag register as used in the method of the present invention.

As is illustrated in FIG. 4, the master file MF contains a flag register FR. In FIG. 5, the flag register FR is rendered in more detail. The flag register FR comprises a plurality of flags F-1, F-2, . . . of e.g. one bit each. Each flag corresponds with a command of the processor (11 in FIG. 2) of the card. The processor and/or its software is arranged in such a way that the execution of a command is inhibited if its corresponding flag is set. The UPDATE command, which updates a memory location, may e.g. only be executed if F-3 is set. Thus an additional protection is provided against the unauthorized or inadvertent execution of (application specific) commands.

The flag register can be controlled by a suitable command, e.g. SET_FLAG-i, where i is the flag number. If the commands concerned are application-specific commands, all flags are preferably initially set, thus preventing the execution of application-specific commands. A flag may be reset by a command-validating command (e.g. VALIDATE), i.e. if the authenticity of the command has been verified and the execution of the command is allowed. It will be understood that the flag register FR may be located in other files that the master file MF, and that more than one flag register may be contained in a card.

Figure 6:
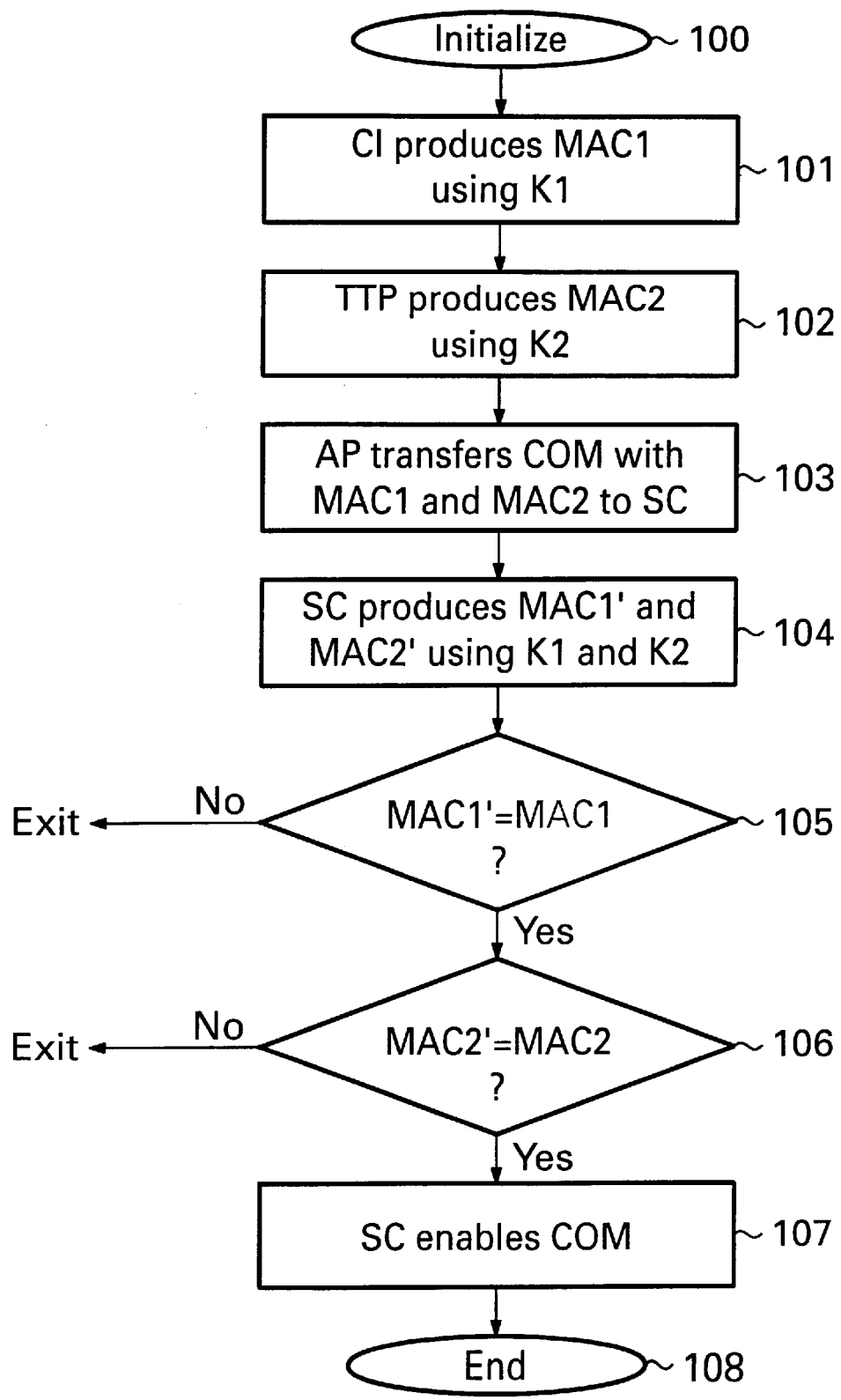
FIG. 6 schematically shows an exemplary embodiment of the method of the present invention.

The flow diagram of FIG. 6 schematically shows an embodiment of the method of the present invention. In step 100, the procedure is initialised. This may involve producing one or more commands and offering the command to the application provider AP, who may in turn transfer the command to the card issuer CI and the third party TTP.

In step 101, the card issuer CI produces a first authentication code MAC1 of the command (COM in FIG. 3) using the first key K1. The code MAC1 is transferred to the application provider AP. The command may have been transferred to the card issuer CI in step 101 or previously, e.g. in step 100.

Similarly, in step 102, the third party TTP produces a second authentication code MAC2 of the command (COM in FIG. 3) using the second key K2. The code MAC2 is transferred to the application provider AP. The command may have been transferred to the third party in step 102 or previously, e.g. in step 100.

In step 103, the application provider AP transfers the command COM with the associated authentication codes MAC1 and MAC2 to the smart card SC (cf. FIG. 3). In step 104, the smart card SC essentially reproduces the codes MAC1 and MAC2 by producing authentication codes MAC1' and MAC2' of the command COM, using the keys K1 and K2 respectively. In step 105, the reproduced code MAC1' is compared with the received code MAC1. If the codes are equal, control is transferred to step 106, otherwise the procedure is exited.

If the procedure is exited, the command COM received by the card is effectively inhibited, either by erasing the command or by setting a flag in the flag register. A retransmission of the command COM and its associated authentication codes may be requested. Preferably the number of retransmissions is monitored and the retransmitting may be terminated if the number of attempts exceeds a predetermined number, e.g. three or five.

In step 106, the reproduced code MAC2' is compared with the received code MAC2. If the codes are equal, control is transferred to step 107, otherwise the procedure is exited.

In step 107, the smart card SC enables the command COM, e.g. by resetting the corresponding flag in the flag register FR (cf. FIG. 5). The command COM may now be invoked and executed. In step 108, the procedure is terminated.

In the diagram of FIG. 6, only the essential steps of a preferred embodiment have been shown. Additional steps, such as the determining and evaluating of the third and fourth authentication codes MAC3 and MAC4, have been omitted for the sake of clarity. It will thus be understood by those skilled in the art that the embodiments described above are given by way of example only and that many modifications and additions are possible without departing from the scope of the present invention.

I claim:

1. A method of securely loading a command or commands in a smart card by a first party, the smart card being issued by a second party, the method comprising the steps of:

the second party producing a first authentication code using a first key, a third party producing a second authentication code using a second key, the first party obtaining the first and second authentication codes from the second party and the third party, respectively, the first party transferring command modifications with the obtained first and second authentication codes to the smart card, the smart card validating the command modifications by obtaining a replica of the first and second authentication codes using stored versions of the first and second key, respectively, and comparing the replica of the first and second authentication codes with the obtained first and second authentication codes transferred with the command modifications from the first party to the smart card.

2. A method according to claim 1, further comprising repeating the transferring and the subsequent validating steps when the validating comparison fails, the use of any loaded command being blocked until the validating comparison succeeds.

3. A method according to claim 2, further comprising permanently disabling the loaded command if the validating comparison fails a predetermined number of times, the predetermined number being less than ten.

4. A method according to claim 3, wherein the permanently disabling step is performed by the card changing the first key stored in the card.

5. A method according to claim 1, wherein the command is an application-specific command.

6. A method according to claim 1, wherein the first and/or second authentication codes are message authentication codes produced according to a particular standard.

7. A method according to claim 1, wherein the card contains several applications, each application being provided with an individual third key for validating a command provided with a third authentication code, said third authentication code being produced using the individual third key.

8. A method according to claim 1, further comprising the second party producing a fourth authentication code of, said fourth authentication code not involving the first or second key.

9. A method according to claim 1, further comprising providing the card with a flag register, each flag of the flag register corresponding with a command of a smart card processor, the execution of a command being inhibited if the corresponding flag is set.

10. A smart card, comprising a substrate and an integrated circuit having a processor and a memory, the memory containing at least two keys the integrated circuit being arranged to regenerate, using the at least two keys at least two authentication codes relative to a received command modification request including at least two corresponding request authentication codes and to compare the at least two regenerated authentication codes with the received at least two corresponding request authentication codes to verify an approved modification to commands is being received.

11. A smart card according to claim 10, wherein the memory comprising a data structure having individual applications, each application containing an individual key (e.g. K3-1, K3-2) for regenerating authentication codes and selectively loading commands associated with the authentication codes when the approved modification is verified.

12. A card according to claim 10, wherein the memory includes a flag register, each flag of the flag register corresponding with a command of the processor, the execution of a command being inhibited if the corresponding flag is set.

* * * * *

UNITED STATES PATENT AND TRADEMARK OFFICE
CERTIFICATE OF CORRECTION

PATENT NO.     : 6,073,238
DATED          : June 6, 2000
INVENTOR(S)    : Michel M.P. Drupsteen It is certified that error appears in the above-identified patent and that said Letters Patent is hereby corrected as shown below:

Item [73], the Assignee data, is incorrect. It should read as follows:

--[73] Assignee: Koninklijke KPN N.V., Groningen, Netherlands ---

Signed and Sealed this

Third Day of July, 2001

*Attest:*

*Attesting Officer*

NICHOLAS P. GODICI
*Acting Director of the United States Patent and Trademark Office*